(12) United States Patent
Kasai

(10) Patent No.: US 8,388,160 B2
(45) Date of Patent: Mar. 5, 2013

(54) BACKLIGHT DEVICE, DISPLAY DEVICE, AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 286 days.

(21) Appl. No.: 12/995,190

(22) PCT Filed: Mar. 26, 2009

(86) PCT No.: PCT/JP2009/055280
§ 371 (c)(1),
(2), (4) Date: Nov. 30, 2010

(87) PCT Pub. No.: WO2009/157226
PCT Pub. Date: Dec. 30, 2009

(65) Prior Publication Data
US 2011/0141374 A1    Jun. 16, 2011

(30) Foreign Application Priority Data
Jun. 27, 2008  (JP) ................................ 2008-168854

(51) Int. Cl.
*G09F 13/04*    (2006.01)

(52) U.S. Cl. .......................... 362/97.1; 362/97.2; 349/64

(58) Field of Classification Search .................. 362/97.1, 362/97.2; 349/64
See application file for complete search history.

(56) References Cited

U.S. PATENT DOCUMENTS

| 5,659,376 A * | 8/1997 | Uehara et al. ................... 349/58 |
| 7,283,118 B2 * | 10/2007 | Nagatani ....................... 345/102 |
| 7,824,050 B2 * | 11/2010 | Tsai et al. ..................... 362/97.4 |
| 8,079,725 B2 * | 12/2011 | Kuromizu .................... 362/97.1 |
| 8,154,569 B2 | 4/2012 | Ford et al. |
| 8,228,458 B2 * | 7/2012 | Kamada .......................... 349/58 |
| 2009/0225252 A1 * | 9/2009 | Jeong .............................. 349/58 |

FOREIGN PATENT DOCUMENTS

| CN | 1808558 A | 7/2006 |
| JP | 2004-279864 A | 10/2004 |
| JP | 2005-243377 A | 9/2005 |
| JP | 2006-301210 A | 11/2006 |

OTHER PUBLICATIONS

Official Communication issued in International Patent Application No. PCT/JP2009/055280, mailed on May 26, 2009.

* cited by examiner

*Primary Examiner* — Stephen F Husar
*Assistant Examiner* — James Cranson, Jr.
(74) *Attorney, Agent, or Firm* — Keating & Bennett, LLP

(57) ABSTRACT

Provided is a backlight device which can suppress a damage of a display panel or a diffusion sheet while suppressing the size of the device. The backlight device (20) includes: a diffusion sheet (25); and a support member (31) having a support plane (31*a*) for supporting the diffusion sheet and arranged below the diffusion sheet. The diffusion sheet has a center of gravity (G1) set at the arrow C direction, i.e., at the side opposite to a liquid crystal display panel (12) as compared to a contact position (tip end (P1)) between the lower surface (25*d*) of the diffusion sheet and the support plane of the support member when the diffusion sheet is not warped.

9 Claims, 7 Drawing Sheets

BACKLIGHT DEVICE, DISPLAY DEVICE, AND TELEVISION RECEIVER

TECHNICAL FIELD

This invention relates to a backlight device, a display device, and a television receiver, and relates particularly to a backlight device including a diffusion plate, a display device, and a television receiver.

BACKGROUND ART

There is conventionally known a display device provided with a backlight device including a diffusion plate. FIGS. 12 and 13 are cross-sectional views showing the structure of a display device provided with, as a conventional example, a backlight device including a diffusion plate.

As shown in FIG. 12, a display device 101 is composed of a display panel 102, a bezel 103 covering a circumferential edge of the display panel 102, and a direct backlight device 110 disposed on the back side of the display panel 102.

The backlight device 110 includes a backlight frame 111, a reflection sheet 112, a plurality of light sources 113, and a diffusion plate 114 that diffuses light from the light sources 113.

The backlight frame 111 includes a back surface portion 111a as well as an upper surface portion 111b and a lower surface portion 111c that are fixed to the back surface portion 111a. Contact members 115 and 116 with which a light incidence surface 114a of the diffusion plate 114 comes into contact are fixed to the upper surface portion 111b and the lower surface portion 111c, respectively.

Furthermore, a support member 117 that is disposed below the diffusion plate 114 and has a support surface 117a for supporting the diffusion plate 114 is fixed to the lower surface portion 111c of the backlight frame 111. The support surface 117a of the support member 117 is formed so that, in a state where the display device 101 (diffusion plate 114) is placed vertically (state shown in FIG. 12), it comes into contact with the entire area of the lower surface of the diffusion plate 114.

Furthermore, the diffusion plate 114 is disposed so that, in the state where the display device 101 (diffusion plate 114) is placed vertically, it is parallel to the display panel 102 and extends in a vertical direction.

There is also conventionally known a display device provided with, similarly to the above-described display device 101, a backlight device including a support member disposed below a diffusion plate (see, for example, Patent Document 1).

Patent Document 1 described above discloses a liquid crystal display device including a color liquid crystal display panel (display panel), an outer frame (bezel) covering a circumferential edge of the color liquid crystal display panel, and a direct backlight device disposed on the back side of the color liquid crystal display panel.

The backlight device of this liquid crystal display device includes a backlight housing portion, a reflection sheet disposed inside the backlight housing portion, a reflection plate (support member) supporting the reflection sheet, a plurality of light-emitting diodes (light sources), a diffusion light guide plate and a diffusion plate that are disposed forward of the light-emitting diodes (on the side of the color liquid crystal display panel), and an optical sheet disposed forward of the diffusion plate (on the side of the color liquid crystal display panel).

The diffusion plate is disposed so that, in a state where the liquid crystal display device is placed vertically, it is parallel to the color liquid crystal display panel and extends in a vertical direction.

The reflection plate is disposed below the diffusion light guide plate and the diffusion plate in the state where the liquid crystal display device is placed vertically and has two support surfaces for supporting the diffusion light guide plate and the diffusion plate.

These two support surfaces are formed so that, in the state where the liquid crystal display device is placed vertically, they come into contact with the entire area of the lower surface of the diffusion light guide plate and the entire area of the lower surface of the diffusion plate, respectively.

Furthermore, an inclined surface is formed between the two support surfaces of the reflection plate. This inclined surface is provided for the purpose of controlling a reflection direction of light.

Patent Document 1: JP-A-2006-301210

DISCLOSURE OF THE INVENTION

Problems to be Solved by the Invention

There are cases, however, where a display panel and a diffusion plate used in a display device are warped due to vibrations caused during transport or under their own weights. The display device 101 provided with the backlight device 110 as the conventional example hence presents a problem that, if the display panel 102 is warped rearward (to the side of the diffusion plate 114) and the diffusion plate 114 is warped forward (to the side of the display panel 102) as shown in FIG. 13, the display panel 102 and the diffusion plate 114 might come into contact with each other, causing the display panel 102 and the diffusion plate 114 to be damaged. In a case where the display panel 102 and the diffusion plate 114 are disposed at an increased distance from each other for the prevention of their contact with each other, there arises another problem that the backlight device 110 (display device 101) is increased in size.

Also in Patent Document 1 described above, similarly to the case of the display device 101 provided with the backlight device 110 as the conventional example, there are cases where the color liquid crystal display panel (display panel) and the diffusion plate are warped due to vibrations caused during transport or under their own weights. Patent Document 1 hence presents a problem that, if the color liquid crystal display panel is warped rearward (to the side of the diffusion plate) and the diffusion plate is warped forward (to the side of the color liquid crystal display panel), the color liquid crystal display panel and the diffusion plate might come into contact with each other via the optical sheet, causing the color liquid crystal display panel, the diffusion plate, and the optical sheet to be damaged.

In order to solve the above-described problems, it is an object of this invention to provide a backlight device, a display device, and a television receiver that are capable of, while suppressing the size increase thereof, preventing a display panel and a diffusion plate from being damaged.

Means for Solving the Problem

In order to achieve the above-described object, a backlight device according to a first aspect of this invention includes: a light source; a diffusion plate that diffuses light from the light source; and a support member that is disposed below the diffusion plate and includes a support surface for supporting the diffusion plate. The diffusion plate includes: a light incidence surface on which light from the light source becomes incident; a light output surface that outputs incident light to the side of a display panel; and an upper surface and a lower surface that extend in a direction intersecting the extending direction of the light incidence surface and the light output surface. The support surface of the support member is in contact with at least part of the lower surface of the diffusion plate. In a state where the diffusion plate is not warped, the center of gravity of the diffusion plate is disposed on the side opposite to the display panel with respect to a position of contact between the lower surface of the diffusion plate and the support surface of the support member.

In this backlight device according to the first aspect, as described above, in the state where the diffusion plate is not warped, the center of gravity of the diffusion plate is disposed on the side opposite to the display panel with respect to a position of contact between the lower surface of the diffusion plate and the support surface of the support member, so that the diffusion plate is acted upon by such a force as to cause the diffusion plate to lean to the side opposite to the display panel. This can prevent the diffusion plate from being warped or moved to the side of the display panel, and thus even if the display panel is warped to the side of the diffusion plate due to vibrations caused during transport or under its own weight, the display panel and the diffusion plate can be prevented from coming into contact with each other. As a result, the display panel and the diffusion plate can be prevented from being damaged.

Furthermore, since the display panel and the diffusion plate can be prevented from coming into contact with each other, there is no need for the display panel and the diffusion plate to be disposed at an increased distance from each other for the prevention of their contact with each other. This can suppress the size increase of the backlight device.

In the above-described backlight device according to the first aspect, preferably, there are further provided: an upper contact member including a first contact surface that comes into contact with the upper portion of the light incidence surface of the diffusion plate; and a lower contact member including a second contact surface that comes into contact with the lower portion of the light incidence surface of the diffusion plate. The first contact surface of the upper contact member is disposed on the side opposite to the display panel with respect to the second contact surface of the lower contact member. According to this configuration, the upper portion of the diffusion plate can be disposed on the side opposite to the display panel with respect to the lower portion of the diffusion plate. That is, the diffusion plate can be disposed so as to be inclined upward toward the side opposite to the display panel. Thus, in the state where the diffusion plate is not warped, the center of gravity of the diffusion plate can easily be disposed on the side opposite to the display panel with respect to a position of contact between the lower surface of the diffusion plate and the support surface of the support member. As a result, the display panel and the diffusion plate can easily be prevented from being damaged.

In the above-described backlight device including the upper contact member and the lower contact member, preferably, in the state where the diffusion plate is not warped, an end of the upper surface of the diffusion plate on the side of the light output surface is disposed on the side opposite to the display panel with respect to an end of the lower surface of the diffusion plate on the side of the light incidence surface. According to this configuration, since the center of gravity of the diffusion plate typically is disposed on a line connecting the end of the upper surface of the diffusion plate on the side of the light output surface to the end of the lower surface of the diffusion plate on the side of the light incidence surface, in the state where the diffusion plate is not warped, the center of gravity of the diffusion plate can more easily be disposed on the side opposite to the display panel with respect to a position of contact between the lower surface of the diffusion plate and the support surface of the support member.

In the above-described backlight device including the upper contact member and the lower contact member, in another possible configuration, in the state where the diffusion plate is not warped, the support surface of the support member is in contact with an end of the lower surface of the diffusion plate on the side of the light incidence surface.

In the above-described backlight device according to the first aspect, preferably, the support surface of the support member is inclined upward toward the side of the display panel and, in the state where the diffusion plate is not warped, is in contact with part of the lower surface of the diffusion plate. According to this configuration, the support surface of the support member can be brought into contact with a portion of the lower surface of the diffusion plate on the side of the display panel. Thus, in the state where the diffusion plate is not warped, the center of gravity of the diffusion plate can easily be disposed on the side opposite to the display panel with respect to a position of contact between the lower surface of the diffusion plate and the support surface of the support member. As a result, the display panel and the diffusion plate can easily be prevented from being damaged.

In the above-described backlight device in which the support surface of the support member is inclined upward toward the side of the display panel, preferably, in the state where the diffusion plate is not warped, the support surface of the support member is in contact with an end of the lower surface of the diffusion plate on the side of the light output surface. According to this configuration, in the state where the diffusion plate is not warped, the center of gravity of the diffusion plate can more easily be disposed on the side opposite to the display panel with respect to a position of contact between the lower surface of the diffusion plate and the support surface of the support member.

In the above-described backlight device in which the support surface of the support member is inclined upward toward the side of the display panel, it also is possible that, in the state where the diffusion plate is not warped, the diffusion plate is disposed parallel with the display panel.

A display device according to a second aspect of this invention includes: the backlight device described above; and a display panel that is illuminated by the backlight device. According to this configuration, a display device can be obtained that is capable of, while suppressing the size increase thereof, preventing a display panel and a diffusion plate from being damaged.

A television receiver according to a third aspect of this invention includes: the above-described display device; a cabinet that houses the display device; a tuner; and a speaker. According to this configuration, a television receiver can be obtained that is capable of, while suppressing the size increase thereof, preventing a display panel and a diffusion plate from being damaged.

Advantages of the Invention

As described above, according to the present invention, a backlight device, a display device, and a television receiver can easily be obtained that are capable of, while suppressing

LIST OF REFERENCE SYMBOLS

Figure 1:
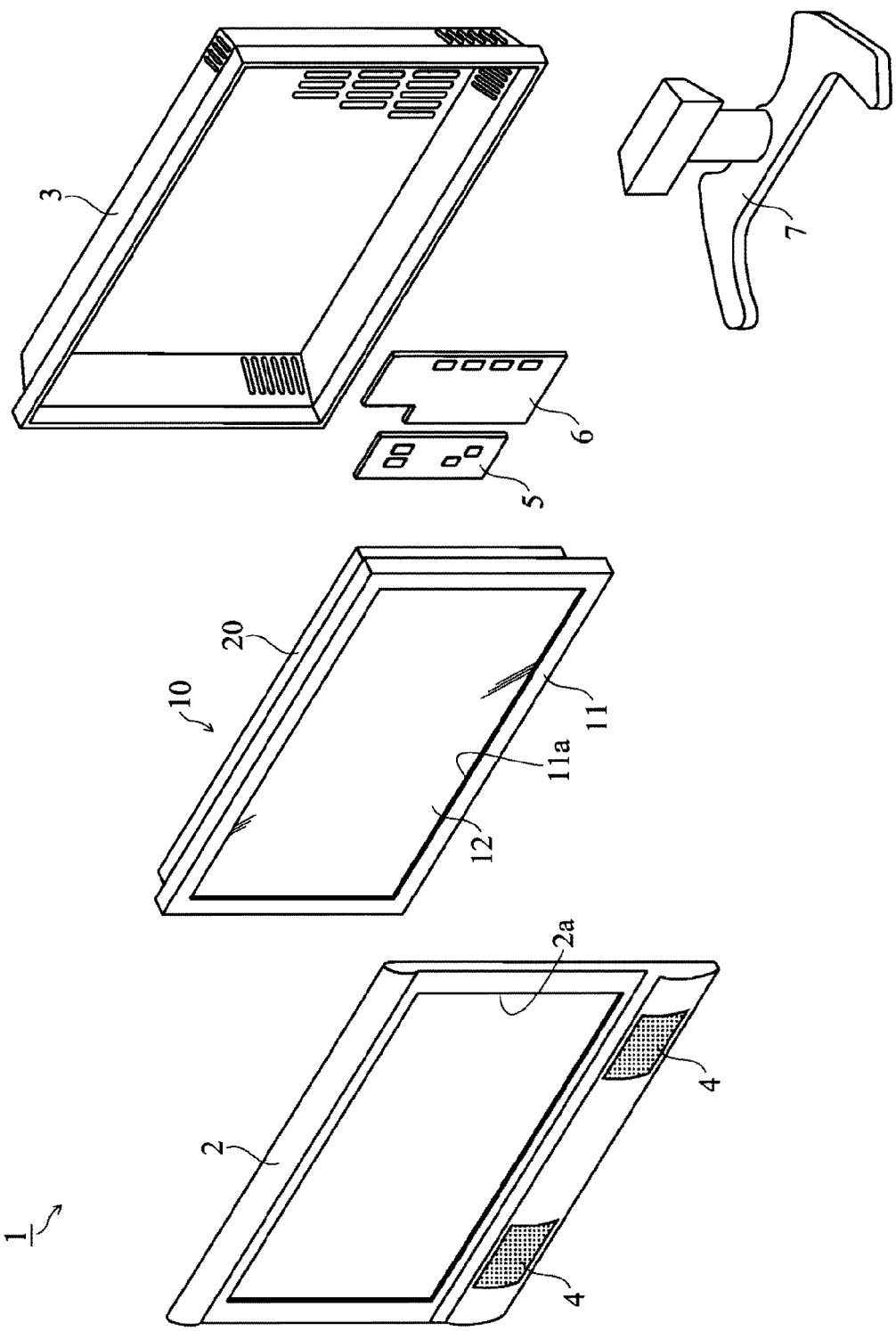
FIG. 1 An exploded perspective view showing an entire configuration of a liquid crystal television receiver provided with a backlight device according to a first embodiment of the present invention.

1 Liquid crystal television receiver (Television receiver)
2 Front cabinet (Cabinet)
3 Rear cabinet (Cabinet)
4 Speaker
5 Tuner
10 Liquid crystal display device (Display device)
12 Liquid crystal display panel (Display panel)
20, 40 Backlight device
23 Fluorescent lamp (Light source)
25, 45 Diffusion plate
25a, 45a Light incidence surface
25b, 45b Light output surface
25c, 45c Upper surface
25d, 45d Lower surface
27, 47 Upper contact member
27a, 47a Front surface (First contact surface)
28, 48 Lower contact member
28a, 48a Front surface (Second contact surface)
31, 51 Support member
31a, 51a Support surface
G1, G11 Center of gravity
P1, P2, P11 End

BEST MODE FOR CARRYING OUT THE INVENTION

First Embodiment

By referring to FIGS. 1 to 6, the following describes the structure of a liquid crystal television receiver 1 provided with a backlight device 20 according to a first embodiment of the present invention. The liquid crystal television receiver 1 constitutes an example of the "television receiver" of the present invention.

As shown in FIG. 1, the liquid crystal television receiver 1 provided with the backlight device 20 according to the first embodiment of the present invention includes a liquid crystal display device 10 including the backlight device 20, a front cabinet 2 and a rear cabinet 3 that are made of resin and house the liquid crystal display device 10, speakers 4 attached to the front cabinet 2, a tuner 5, a power supply 6, and a stand 7. The front cabinet 2, the rear cabinet 3, the speakers 4, the tuner 5, the power supply 6, and the stand 7 may be of conventional types in general use, respectively, and thus are described only briefly. The liquid crystal display device 10 constitutes an example of the "display device" of the present invention, and the front cabinet 2 and the rear cabinet 3 constitute an example of the "cabinet" of the present invention.

The front cabinet 2 is provided so as to cover a front side portion of the liquid crystal display device 10, and a window portion 2a is formed in a portion thereof corresponding to a liquid crystal display panel 12, which will be described later, of the liquid crystal display device 10. The rear cabinet 3 is provided so as to entirely cover a back side (rear side) portion of the liquid crystal display device 10. The liquid crystal display device 10, the tuner 5, and the power supply 6 are housed by the front cabinet 2 and the rear cabinet 3. The tuner 5 has a function of generating an image signal and an audio signal of a predetermined channel based on received radio waves. The speakers 4 have a function of outputting sounds based on an audio signal generated by the tuner 5. The power supply 6 is configured to supply the liquid crystal display device 10, the speakers 4, and the tuner 5 with power. The liquid crystal display device 10 is supported by the stand 7. In another possible configuration, the speakers 4, the tuner 5, and the power supply 6 are assembled in the liquid crystal display device 10.

Figure 2:
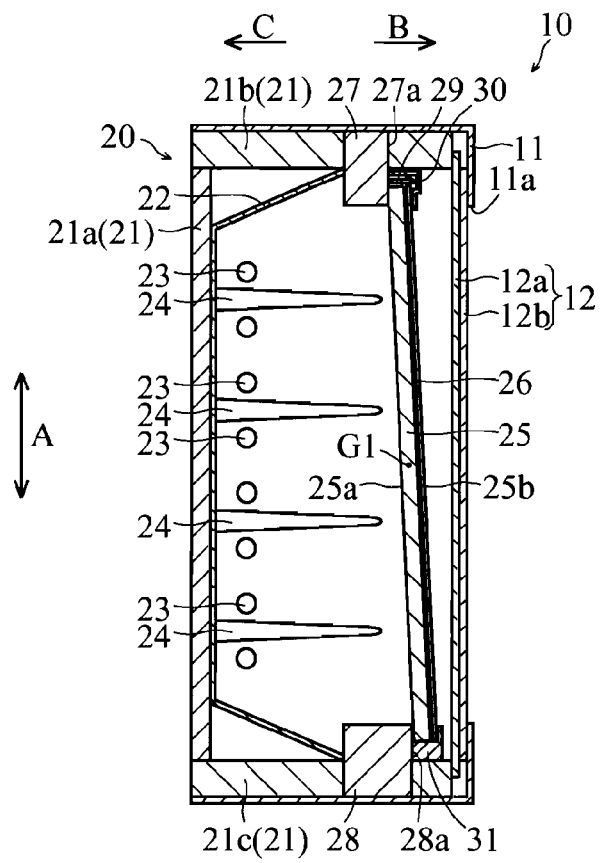
FIG. 2 A cross-sectional view showing a structure of a liquid crystal display device provided with the backlight device according to the first embodiment shown in FIG. 1.

As shown in FIGS. 1 and 2, the liquid crystal display device 10 is disposed in a vertically placed state (state in which the liquid crystal display panel 12, which will be described later, is disposed so as to extend in a vertical direction (A-direction)).

Furthermore, as shown in FIG. 2, the liquid crystal display device 10 is composed of a bezel 11 having an opening portion 11a, the liquid crystal display panel 12 whose circumferential edge is covered by the bezel 11, and the direct backlight device 20 disposed rearward of the liquid crystal display panel 12 (on the side of an arrow C direction). The liquid crystal display panel 12 constitutes an example of the "display panel" of the present invention.

The liquid crystal display panel 12 includes an AM substrate (active matrix substrate) 12a and an opposed substrate 12*b* disposed so as to be opposed to the AM substrate 12*a*. Furthermore, liquid crystals (not shown) are sealed in between the AM substrate 12*a* and the opposed substrate 12*b*. The liquid crystal display panel 12 is illuminated by the backlight device 20 and thus functions as a display panel.

The backlight device 20 includes a metallic backlight frame 21, a reflection sheet 22, a plurality of fluorescent lamps 23, a plurality of pins 24, a diffusion plate 25 that is disposed forward of the fluorescent lamps 23 (on the side of an arrow B direction) and diffuses light from the fluorescent lamps 23, and an optical sheet 26. The fluorescent lamps 23 constitute an example of the "light source" of the present invention.

The backlight frame 21 includes a back surface portion 21*a* as well as an upper surface portion 21*b* and a lower surface portion 21*c* that are fixed to the back surface portion 21*a*.

The reflection sheet 22 has a function of reflecting light outputted rearward from the plurality of fluorescent lamps 23 thereby to make the light travel forward.

The plurality of pins 24 are formed so as to extend toward the side of the diffusion plate 25 (arrow B direction) and, in a state where the diffusion plate 25 is not warped (state shown in FIG. 2), are disposed in positions at a predetermined distance from a light incidence surface 25*a*, which will be described later, of the diffusion plate 25. The plurality of pins 24 have a function of preventing the diffusion plate 25 from being warped excessively to the side of the fluorescent lamps 23 (side of the arrow C direction).

The diffusion plate 25 includes the light incidence surface 25*a* on which light from the fluorescent lamps 23 becomes incident, a light output surface 25*b* that outputs incident light to the side of the liquid crystal display panel 12 (side of the arrow B direction), and an upper surface 25*c* (see FIG. 3) and a lower surface 25*d* (see FIG. 4) that extend in a direction orthogonal to the extending direction of the light incidence surface 25*a* and the light output surface 25*b*.

The upper portion of the light incidence surface 25*a* of the diffusion plate 25 is in contact with a front surface 27*a* of an upper contact member 27, and the lower portion of the light incidence surface 25*a* of the diffusion plate 25 is in contact with a front surface 28*a* of a lower contact member 28. The front surface 27*a* of the upper contact member 27 and the front surface 28*a* of the lower contact member 28 are formed so as to extend in the vertical direction (A-direction). The front surface 27*a* of the upper contact member 27 and the front surface 28*a* of the lower contact member 28 may be, for example, inclined rearward toward the upper side. The front surface 27*a* constitutes an example of the "first contact surface" of the present invention, and the front surface 28*a* constitutes an example of the "second contact surface" of the present invention.

Furthermore, the upper contact member 27 and the lower contact member 28 are fixed to the upper surface portion 21*b* and the lower surface portion 21*c* of the backlight frame 21, respectively. Furthermore, the upper contact member 27 and the lower contact member 28 also may be formed integrally with the upper surface portion 21*b* and the lower surface portion 21*c* of the backlight frame 21, respectively.

Figure 3:
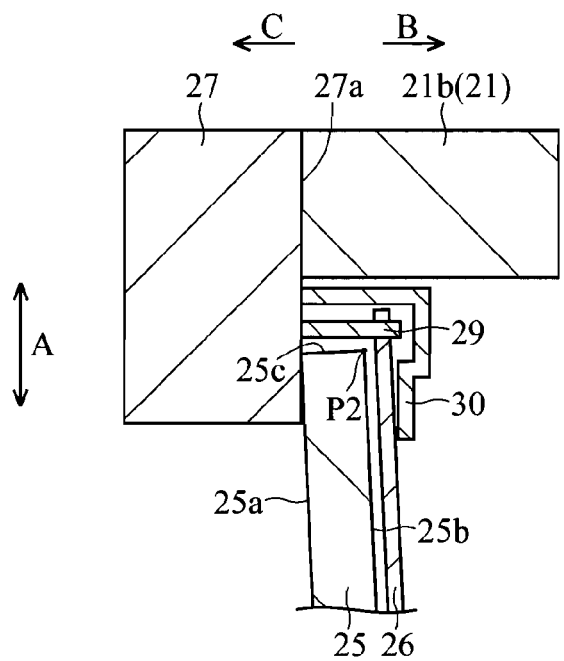
FIG. 3 A cross-sectional view showing a detailed structure of the backlight device according to the first embodiment shown in FIG. 2.

Furthermore, as shown in FIG. 3, a boss 29 is fixed to the front surface 27*a* of the upper contact member 27, and an optical sheet 26 is hung on the boss 29. The optical sheet 26 is formed of a plurality of sheet members including a prism sheet, a lens sheet, and the like and has a function of focusing light from the fluorescent lamps 23 in a range of a predetermined viewing angle. The boss 29 also may be formed integrally with the upper contact member 27 or the upper surface portion 21*b* of the backlight frame 21.

Furthermore, an upper presser member 30 is fixed to the front surface 27*a* of the upper contact member 27. The respective upper portions of the diffusion plate 25 and the optical sheet 26 are held in a predetermined position by the upper contact member 27 and the upper presser member 30. The upper presser member 30 also may be formed integrally with the upper contact member 27.

Figure 4:
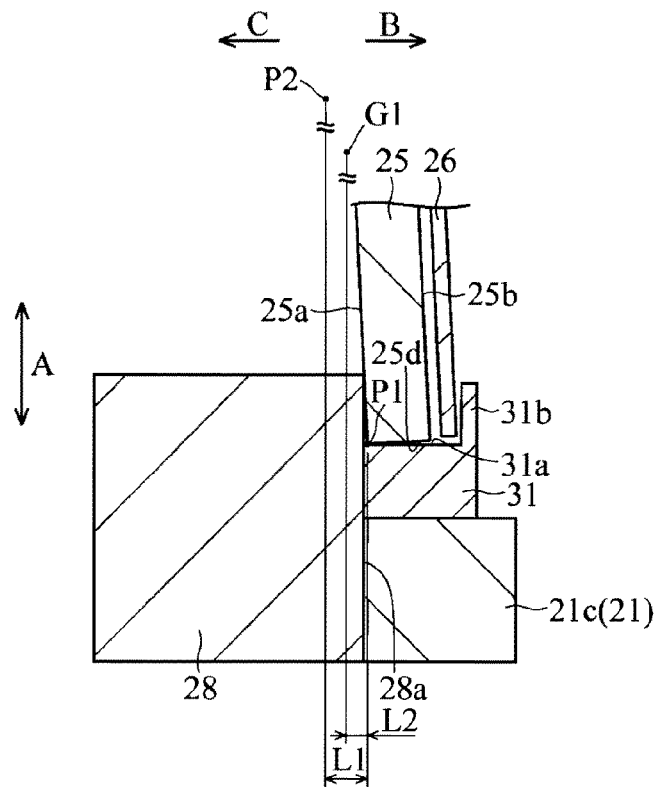
FIG. 4 A cross-sectional view showing a detailed structure of the backlight device according to the first embodiment shown in FIG. 2.

Furthermore, as shown in FIG. 4, a support member 31 having a support surface 31*a* for supporting the diffusion plate 25 is disposed forward of the lower contact member 28. The support member 31 is disposed below the diffusion plate 25. Furthermore, the support member 31 is formed so as to extend in the width direction of the backlight device 20 (diffusion plate 25) (direction perpendicular to the plane of FIG. 4), and the support surface 31*a* of the support member 31 is in contact with the lower surface 25*d* of the diffusion plate 25 along the width direction of the diffusion plate 25 (direction perpendicular to the plane of FIG. 4). The support member 31 may be fixed to the lower contact member 28 or the lower surface portion 21*c* of the backlight frame 21, or also may be formed integrally with the lower contact member 28 or the lower surface portion 21*c* of the backlight frame 21.

Furthermore, a lower presser portion 31*b* that protrudes upward is formed on the support member 31. The respective lower portions of the diffusion plate 25 and the optical sheet 26 are held in a predetermined position by the lower presser portion 31*b* of the support member 31 and the lower contact member 28. The lower presser portion 31*b* also may be configured as a separate body from the support member 31.

In the first embodiment, as shown in FIG. 2, the front surface 27*a* of the upper contact member 27 is disposed on the side of the fluorescent lamps 23 (side opposite to the liquid crystal display panel 12 (side of the arrow C direction)) so as to be closer to the fluorescent lamps 23 than the front surface 28*a* of the lower contact member 28. Thus, in the state where the diffusion plate 25 is not warped (state shown in FIG. 2), the diffusion plate 25 is disposed so as to be inclined rearward toward the upper side.

Figure 5:
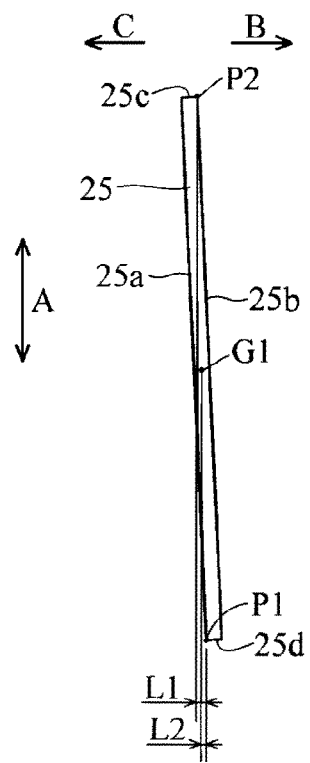
FIG. 5 A cross-sectional view showing a detailed structure of a diffusion plate of the backlight device according to the first embodiment shown in FIG. 2.

To be specific, as shown in FIGS. 4 and 5, the diffusion plate 25 comes into contact with the support surface 31*a* of the support member 31 only at an end P1 of the lower surface 25*d* thereof on the side of the light incidence surface 25*a* (side of the arrow C direction).

Furthermore, in the state where the diffusion plate 25 is not warped, an end P2 of the upper surface 25*c* of the diffusion plate 25 on the side of the light output surface 25*b* (side of the arrow B direction) is disposed on the rear side (side opposite to the liquid crystal display panel 12 (side of the arrow C direction)) so as to be more rearward by a distance L1 than the end P1 of the lower surface 25*d* of the diffusion plate 25 on the side of the light incidence surface 25*a*. Thus, in the state where the diffusion plate 25 is not warped, a center G1 of gravity (center) of the diffusion plate 25 is positioned on the rear side so as to be more rearward by a distance L2 (=L1/2) than a position of contact between the lower surface 25*d* of the diffusion plate 25 and the support surface 31*a* of the support member 31 (the end P1 of the lower surface 25*d* of the diffusion plate 25 on the side of the light incidence surface 25*a*).

The center G1 of gravity of the diffusion plate 25 is positioned at the center of a line (not shown) connecting the end P2 of the upper surface 25*c* of the diffusion plate 25 on the side of the light output surface 25*b* to the end P1 of the lower surface 25*d* of the diffusion plate 25 on the side of the light incidence surface 25*a*.

Figure 6:
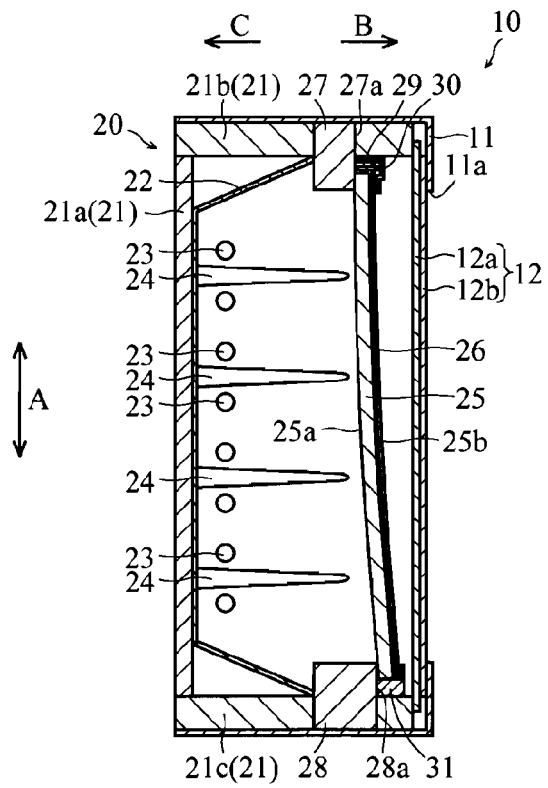
FIG. 6 A cross-sectional view showing a state where the diffusion plate of the liquid crystal display device provided with the backlight device according to the first embodiment shown in FIG. 2 is warped.

As described thus far, in the first embodiment, in the state where the diffusion plate 25 is not warped (state shown in FIG. 2), the center G1 of gravity (center) of the diffusion plate 25 is disposed to be positioned on the rear side (side of the arrow C direction) so as to be more rearward than the position of contact between the lower surface 25d of the diffusion plate 25 and the support surface 31a of the support member 31 (end P1 of the diffusion plate 25), so that the diffusion plate 25 is acted upon by such a force as to cause the diffusion plate 25 to lean to the side of the fluorescent lamps 23 (side of the arrow C direction). Since the upper portion of the light incidence surface 25a of the diffusion plate 25 is in contact with the front surface 27a of the upper contact member 27, as shown in FIG. 6, the diffusion plate 25 is warped to the side of the fluorescent lamps 23 (side of the arrow C direction).

In the first embodiment, as described above, in the state where the diffusion plate 25 is not warped, the center G1 of gravity of the diffusion plate 25 is disposed on the rear side (side opposite to the liquid crystal display panel 12) so as to be more rearward than the position of contact between the lower surface 25d of the diffusion plate 25 and the support surface 31a of the support member 31 (end P1 of the diffusion plate 25), so that the diffusion plate 25 is acted upon by such a force as to cause the diffusion plate 25 to lean rearward. Since the upper portion of the light incidence surface 25a of the diffusion plate 25 is in contact with the front surface 27a of the upper contact member 27, the diffusion plate 25 is warped to the side of the fluorescent lamps 23 (side of the arrow C direction). This can prevent the diffusion plate 25 from being warped to the side of the liquid crystal display panel 12, and thus even if the liquid crystal display panel 12 is warped to the side of the diffusion plate 25 due to vibrations caused during transport or under its own weight, the liquid crystal display panel 12 and the diffusion plate 25 can be prevented from coming into contact with each other via the optical sheet 26. As a result, the liquid crystal display panel 12, the diffusion plate 25, and the optical sheet 26 can be prevented from being damaged.

Furthermore, since the liquid crystal display panel 12 and the diffusion plate 25 can be prevented from coming into contact with each other via the optical sheet 26, there is no need for the liquid crystal display panel 12 and the diffusion plate 25 to be disposed at an increased distance from each other for the prevention of their contact with each other via the optical sheet 26. This can suppress the size increase of the backlight device 20 (liquid crystal display device 10).

Furthermore, in the first embodiment, as described above, the front surface 27a of the upper contact member 27 is disposed on the rear side (side opposite to the liquid crystal display panel 12) so as to be more rearward than the front surface 28a of the lower contact member 28, and thus the upper portion of the diffusion plate 25 can be disposed on the rear side so as to be more rearward than the lower portion of the diffusion plate 25. That is, the diffusion plate 25 can be disposed so as to be inclined upward toward the rear side. Thus, in the state where the diffusion plate 25 is not warped, the center G1 of gravity of the diffusion plate 25 can easily be disposed on the rear side so as to be more rearward than the position of contact between the lower surface 25d of the diffusion plate 25 and the support surface 31a of the support member 31. As a result, the liquid crystal display panel 12, the diffusion plate 25, and the optical sheet 26 can easily be prevented from being damaged.

Furthermore, in the first embodiment, as described above, in the state where the diffusion plate 25 is not warped, the end P2 of the upper surface 25c of the diffusion plate 25 on the side of the light output surface 25b is disposed on the rear side (side opposite to the liquid crystal display panel 12) so as to be more rearward than the end P1 of the lower surface 25d of the diffusion plate 25 on the side of the light incidence surface 25a. Accordingly, since the center G1 of gravity of the diffusion plate 25 is disposed on the line connecting the end P2 of the upper surface 25c of the diffusion plate 25 on the side of the light output surface 25b to the end P1 of the lower surface 25d of the diffusion plate 25 on the side of the light incidence surface 25a, in the state where the diffusion plate 25 is not warped, the center G1 of gravity of the diffusion plate 25 can easily be disposed on the rear side so as to be more rearward than the position of contact between the lower surface 25d of the diffusion plate 25 and the support surface 31a of the support member 31 (end P1 of the diffusion plate 25).

Second Embodiment

By referring to FIGS. 7 to 11, this second embodiment describes a case where, unlike the above-described first embodiment, a front surface 47a of an upper contact member 47 is not disposed on the side of fluorescent lamps 23 (side of an arrow C direction) so as to be closer to the fluorescent lamps 23 than a front surface 48a of a lower contact member 48.

In a backlight device 40 according to the second embodiment of the present invention, similarly to the above-described first embodiment, a diffusion plate 45 includes a light incidence surface 45a on which light from the fluorescent lamps 23 becomes incident, a light output surface 45b that outputs incident light to the side of a liquid crystal display panel 12 (side of an arrow B direction), and an upper surface 45c (see FIG. 8) and a lower surface 45d (see FIG. 9) that extend in a direction (the arrow B direction and the arrow C direction) orthogonal to the extending direction of the light incidence surface 45a and the light output surface 45b (A-direction).

The upper portion of the light incidence surface 45a of the diffusion plate 45 is in contact with the front surface 47a of the upper contact member 47, and the lower portion of the light incidence surface 45a of the diffusion plate 45 is in contact with the front surface 48a of the lower contact member 48. The front surface 47a of the upper contact member 47 and the front surface 48a of the lower contact member 48 are formed so as to extend in a vertical direction (A-direction). The front surface 47a constitutes an example of the "first contact surface" of the present invention, and the front surface 48a constitutes an example of the "second contact surface" of the present invention.

Figure 9:
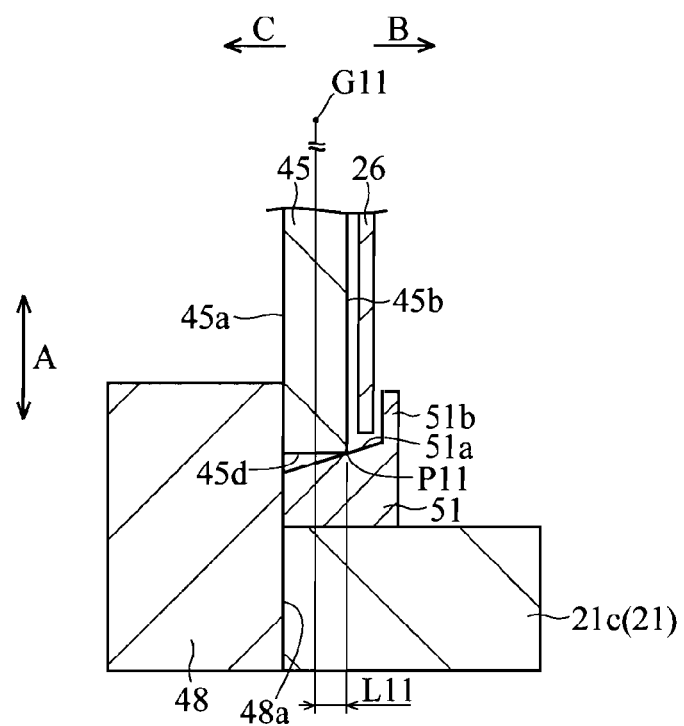
FIG. 9 A cross-sectional view showing a detailed structure of the backlight device according to the second embodiment shown in FIG. 7.

As shown in FIG. 9, a support member 51 having a support surface 51a for supporting the diffusion plate 45 is disposed forward of the lower contact member 48. The support member 51 is disposed below the diffusion plate 45.

Furthermore, a lower presser portion 51b that protrudes upward is formed on the support member 51. The respective lower portions of the diffusion plate 45 and an optical sheet 26 are held in a predetermined position by the lower presser portion 51b of the support member 51 and the lower contact member 48.

Figure 7:
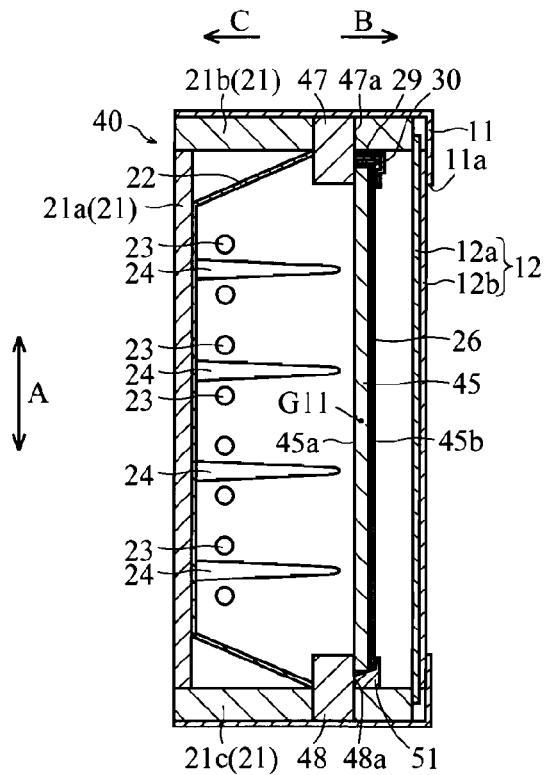
FIG. 7 A cross-sectional view showing a structure of a liquid crystal display device provided with a backlight device according to a second embodiment of the present invention.
Figure 8:
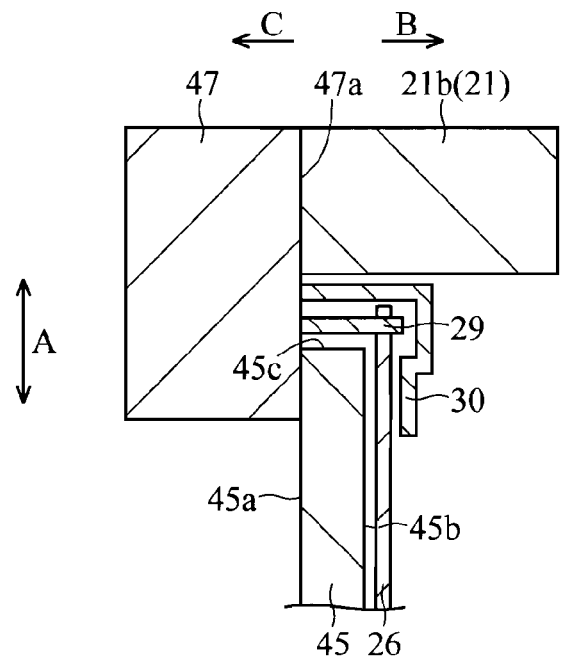
FIG. 8 A cross-sectional view showing a detailed structure of the backlight device according to the second embodiment shown in FIG. 7.

In the second embodiment, as shown in FIG. 7, the front surface 47a of the upper contact member 47 is disposed in a position directly above the front surface 48a of the lower contact member 48. That is, the front surface 47a of the upper contact member 47 is not disposed on the side of the fluorescent lamps 23 (side of the arrow C direction) so as to be closer to the fluorescent lamps 23 than the front surface 48a of the lower contact member 48. Thus, in the second embodiment, in a state where the diffusion plate 45 is not warped (state shown in FIG. 7), the diffusion plate 45 is not inclined rearward toward the upper side but is disposed parallel with the liquid crystal display panel 12.

Furthermore, in the second embodiment, as shown in FIG. 9, the support surface 51*a* of the support member 51 is inclined upward toward the front side (side of the liquid crystal display panel 12 (side of the arrow B direction)). In the state where the diffusion plate 45 is not warped, the diffusion plate 45 is in contact with the support surface 51*a* of the support member 51 only at an end P11 of the lower surface 45*d* thereof on the side of the light output surface 45*b* (side of the arrow B direction).

Figure 10:
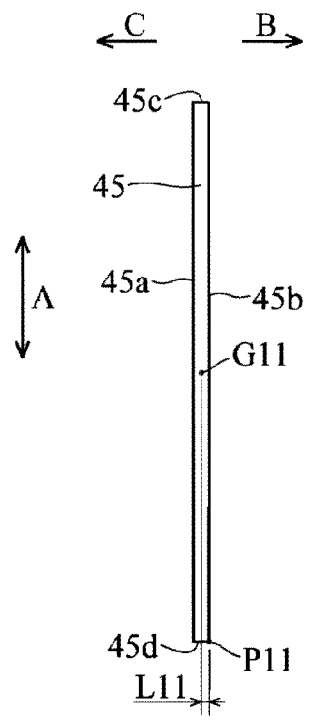
FIG. 10 A cross-sectional view showing a detailed structure of a diffusion plate of the backlight device according to the second embodiment shown in FIG. 7.

Thus, as shown in FIGS. 9 and 10, in the state where the diffusion plate 45 is not warped, a center G11 of gravity (center) of the diffusion plate 45 is positioned on the rear side (side of the arrow C direction) so as to be more rearward by a distance L11 than a position of contact between the lower surface 45*d* of the diffusion plate 45 and the support surface 51*a* of the support member 51 (the end P11 of the lower surface 45*d* of the diffusion plate 45 on the side of the light output surface 45*b*).

Figure 11:
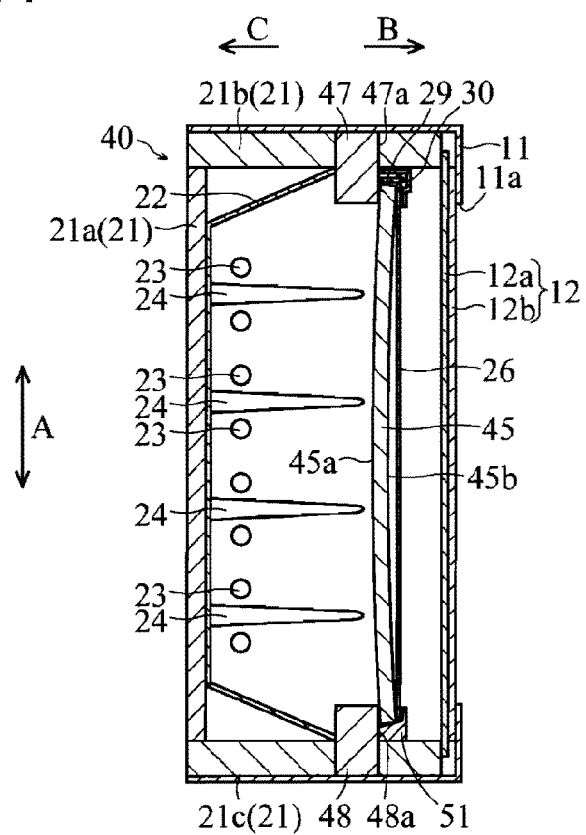
FIG. 11 A cross-sectional view showing a state where the diffusion plate of the liquid crystal display device provided with the backlight device according to the second embodiment shown in FIG. 7 is warped.
Figure 12:
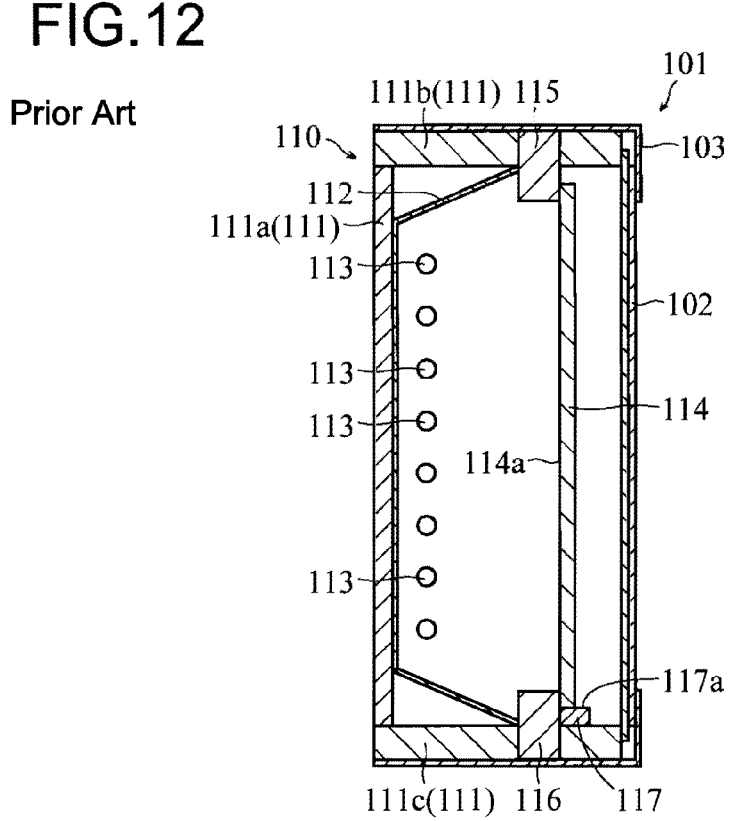
FIG. 12 A cross-sectional view showing a structure of a display device provided with a backlight device as a conventional example.
Figure 13:
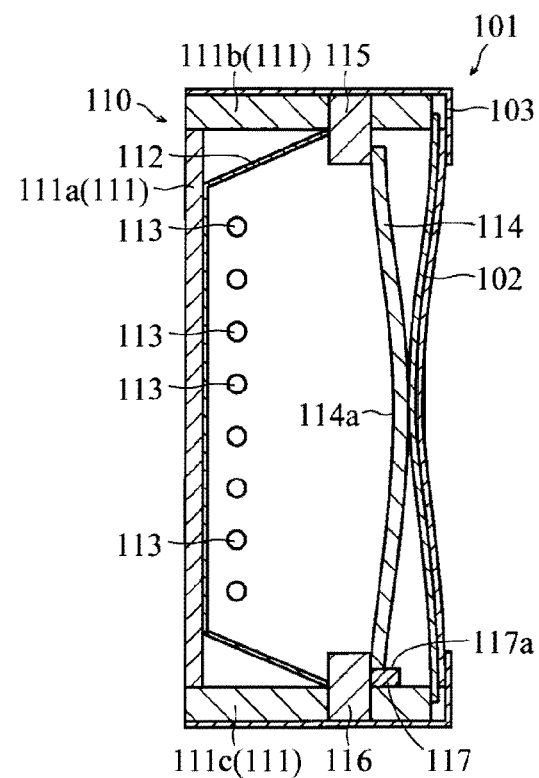
FIG. 13 A cross-sectional view showing a state where a diffusion plate and a display panel of the display device provided with the backlight device as the conventional example shown in FIG. 12 are so warped as to be in contact with each other.

As described thus far, in the second embodiment, in the state where the diffusion plate 45 is not warped (state shown in FIG. 7), the center G11 of gravity (center) of the diffusion plate 45 is disposed to be positioned on the rear side (side opposite to the liquid crystal display panel 12 (side of the arrow C direction)) so as to be more rearward than the position of contact between the lower surface 45*d* of the diffusion plate 45 and the support surface 51*a* of the support member 51 (end P11 of the diffusion plate 45), so that the diffusion plate 45 is acted upon by such a force as to cause the diffusion plate 45 to lean to the side of the fluorescent lamps 23 (side of the arrow C direction). Since the upper portion of the light incidence surface 45*a* of the diffusion plate 45 is in contact with the front surface 47*a* of the upper contact member 47, as shown in FIG. 11, the diffusion plate 45 is warped to the side of the fluorescent lamps 23 (side of the arrow C direction).

In a state where the diffusion plate 45 is warped to the side of the fluorescent lamps 23 (state shown in FIG. 11), the support surface 51*a* of the support member 51 may either be in contact only with the end P11 of the lower surface 45*d* of the diffusion plate 45 on the side of the light output surface 45*b* or be in contact with the entire area of the lower surface 45*d* of the diffusion plate 45. It is, however, more preferable that the support surface 51*a* of the support member 51 is in contact only with the end P11 of the lower surface 45*d* of the diffusion plate 45 on the side of the light output surface 45*b*.

Other structures of the second embodiment are similar to those of the above-described first embodiment.

In the second embodiment, as described above, the support surface 51*a* of the support member 51 is inclined upward toward the front side (side of the liquid crystal display panel 12), and therefore, in the state where the diffusion plate 45 is not warped, the support surface 51*a* of the support member 51 can be brought into contact with the end P11 of the lower surface 45*d* of the diffusion plate 45 on the side of the light output surface 45*b*. Thus, in the state where the diffusion plate 45 is not warped, the center G11 of gravity of the diffusion plate 45 can easily be disposed on the rear side (side opposite to the liquid crystal display panel 12) so as to be more rearward than the position of contact between the lower surface 25*d* of the diffusion plate 45 and the support surface 51*a* of the support member 51 (end P11 of the diffusion plate 45). As a result, the liquid crystal display panel 12, the diffusion plate 45, and the optical sheet 26 can easily be prevented from being damaged.

Other effects of the second embodiment are similar to those of the above-described first embodiment.

The embodiments disclosed in this application are to be considered in all respects as illustrative and not limiting. The scope of the present invention is indicated by the appended claims rather than by the foregoing description of the embodiments, and all changes that come within the meaning and range of equivalency of the claims are intended to be embraced therein.

For example, the above-described embodiments have shown an example applying the display panel, the display device, and the television receiver to a liquid crystal display panel, a liquid crystal display device, and a liquid crystal television receiver, respectively. The present invention, however, is not limited thereto and may be applied also to a display panel, a display device, and a television receiver other than a liquid crystal display panel, a liquid crystal display device, and a liquid crystal television receiver.

Furthermore, the above-described embodiments have shown an example in which a liquid crystal display device is used in a television receiver with a stand. The present invention, however, is not limited thereto, and a liquid crystal display device may be used also in a wall-hanging television receiver or in systems other than a television receiver, such as, for example, an information display.

Furthermore, the above-described embodiments have shown an example in which the present invention is applied to a direct backlight device. The present invention, however, is not limited thereto and may be applied also to an edge-light backlight device.

Furthermore, the above-described embodiments have shown an example in which a support member is formed so as to extend in the width direction of a backlight device (liquid crystal display device). The present invention, however, is not limited thereto, and a support member formed of, for example, a plurality of bosses in the shape of a cylindrical column or a quadrangular prism also may be used.

Furthermore, the above-described embodiments have shown an example in which an optical sheet is disposed between a diffusion plate and a liquid crystal display panel and used in a hung state. The present invention, however, is not limited thereto, and it also is possible that a plate-shaped optical member is disposed between a diffusion plate and a liquid crystal display panel. In this case, the plate-shaped optical member is disposed in a similar manner to the diffusion plate, thereby allowing the optical member to be prevented from being warped to the side of the liquid crystal display panel.

The invention claimed is:

1. A backlight device comprising:
   a light source;
   a diffusion plate that diffuses light from the light source; and
   a support member that is disposed below the diffusion plate and includes a support surface for supporting the diffusion plate,
   wherein
   the diffusion plate includes:
      a light incidence surface on which light from the light source becomes incident;
      a light output surface that outputs incident light to a side of a display panel; and
      an upper surface and a lower surface that extend in a direction intersecting an extending direction of the light incidence surface and the light output surface,
   the support surface of the support member is in contact with at least part of the lower surface of the diffusion plate, and in a state where the diffusion plate is not warped, a center of gravity of the diffusion plate is disposed on a side opposite to the display panel with respect to a position of contact between the lower surface of the diffusion plate and the support surface of the support member.

2. The backlight device according to claim 1, further comprising:
an upper contact member including a first contact surface that comes into contact with an upper portion of the light incidence surface of the diffusion plate; and
a lower contact member including a second contact surface that comes into contact with a lower portion of the light incidence surface of the diffusion plate,
wherein the first contact surface of the upper contact member is disposed on the side opposite to the display panel with respect to the second contact surface of the lower contact member.

3. The backlight device according to claim 2, wherein, in the state where the diffusion plate is not warped, an end of the upper surface of the diffusion plate on a side of the light output surface is disposed on the side opposite to the display panel with respect to an end of the lower surface of the diffusion plate on a side of the light incidence surface.

4. The backlight device according to claim 2, wherein, in the state where the diffusion plate is not warped, the support surface of the support member is in contact with an end of the lower surface of the diffusion plate on a side of the light incidence surface.

5. The backlight device according to claim 1, wherein the support surface of the support member is inclined upward toward the side of the display panel and, in the state where the diffusion plate is not warped, is in contact with part of the lower surface of the diffusion plate.

6. The backlight device according to claim 5, wherein, in the state where the diffusion plate is not warped, the support surface of the support member is in contact with an end of the lower surface of the diffusion plate on a side of the light output surface.

7. The backlight device according to claim 5, wherein, in the state where the diffusion plate is not warped, the diffusion plate is disposed parallel with the display panel.

8. A display device comprising:
the backlight device according to claim 1; and
a display panel that is illuminated by the backlight device.

9. A television receiver comprising:
the display device according to claim 8;
a cabinet that houses the display device;
a tuner; and
a speaker.

* * * * *